(12) United States Patent
Sullivan et al.

(10) Patent No.: US 11,583,731 B2
(45) Date of Patent: Feb. 21, 2023

(54) GOLF BALLS HAVING LAYERS MADE OF SILICONE ELASTOMERS

(71) Applicant: Acushnet Company, Fairhaven, MA (US)

(72) Inventors: Michael J. Sullivan, Old Lyme, CT (US); Mark L. Binette, Mattapoisett, MA (US); Brian Comeau, Berkley, MA (US)

( * ) Notice: Subject to any disclaimer, the term of this patent is extended or adjusted under 35 U.S.C. 154(b) by 0 days.

(21) Appl. No.: 17/474,173

(22) Filed: Sep. 14, 2021

(65) Prior Publication Data

US 2021/0402262 A1 Dec. 30, 2021

Related U.S. Application Data

(60) Division of application No. 16/416,405, filed on May 20, 2019, now Pat. No. 11,117,022, which is a
(Continued)

(51) Int. Cl.
*A63B 37/06* (2006.01)
*A63B 37/00* (2006.01)
(Continued)

(52) U.S. Cl.
CPC ...... *A63B 37/0051* (2013.01); *A63B 37/0024* (2013.01); *A63B 37/0027* (2013.01); *A63B 37/0031* (2013.01); *A63B 37/0033* (2013.01); *A63B 37/0039* (2013.01); *A63B 37/0043* (2013.01); *A63B 37/0044* (2013.01); *A63B 37/0045* (2013.01); *A63B 37/0047* (2013.01); *A63B 37/0062* (2013.01); *A63B 37/0063* (2013.01); *A63B 37/0064* (2013.01); *A63B 37/0066* (2013.01); *A63B 37/0075* (2013.01);
(Continued)

(58) Field of Classification Search
CPC .......................... A63B 37/0075; A63B 37/0076
USPC ........................................................ 473/376
See application file for complete search history.

(56) References Cited

U.S. PATENT DOCUMENTS 4,836,552 A 6/1989 Pucket et al.
4,839,116 A 6/1989 Puckett et al.
(Continued)

FOREIGN PATENT DOCUMENTS

EP 0154735 9/1985

OTHER PUBLICATIONS

"Ultra-High Elongation Silicone Elastomers"; Barry Arkles, Jonathan Goff, Santy Sulaiman and Alison Sikorsky; Rubber World, (Jun. 2016) pp. 29-34.
(Continued)

*Primary Examiner* — Raeann Gorden

(57) ABSTRACT

Multi-layered golf balls having at least one layer made of a foamed silicone composition are provided. Multi-layered golf balls having at least one layer made of non-foamed silicone elastomer composition also are provided. For example, three-piece, four-piece, and five-piece golf balls containing different core and cover structures can be made. The foamed silicones have good thermal stability and durability without sacrificing resiliency. The non-foamed silicone elastomers have high elongation, tensile strength, chemical/fluid-resistance, and weatherability properties. These compositions can be used to form any layer, for example, core, intermediate, or cover, in the golf ball.

8 Claims, 3 Drawing Sheets

Related U.S. Application Data division of application No. 15/290,175, filed on Oct. 11, 2016, now Pat. No. 10,293,216, which is a continuation-in-part of application No. 15/181,723, filed on Jun. 14, 2016, now Pat. No. 9,814,939, which is a continuation of application No. 14/071,819, filed on Nov. 5, 2013, now Pat. No. 9,375,612.

(51) Int. Cl.
| | | |
|---|---|---|
| *C09D 123/08* | (2006.01) | |
| *C08L 23/08* | (2006.01) | |
| *C08L 83/04* | (2006.01) | |
| *C08L 77/00* | (2006.01) | |

(52) U.S. Cl.
CPC ...... *A63B 37/0076* (2013.01); *A63B 37/0091* (2013.01); *A63B 37/00921* (2020.08); *C08L 23/0876* (2013.01); *C08L 83/04* (2013.01); *C09D 123/0876* (2013.01); *C08L 77/00* (2013.01)

(56) References Cited

U.S. PATENT DOCUMENTS

| | | | |
|---|---|---|---|
| 5,104,126 | A | 4/1992 | Gentiluomo |
| 5,253,871 | A | 10/1993 | Viollaz |
| 5,439,227 | A | 8/1995 | Egashira et al. |
| 5,482,285 | A | 1/1996 | Yabuki et al. |
| 5,556,098 | A | 9/1996 | Higuchi et al. |
| 5,688,192 | A | 11/1997 | Aoyama |
| 5,688,595 | A | 11/1997 | Yamagishi et al. |
| 5,725,442 | A | 3/1998 | Higuchi et al. |
| 5,823,889 | A | 10/1998 | Aoyama |
| 5,833,553 | A | 11/1998 | Sullivan et al. |
| 6,057,403 | A | 5/2000 | Sullivan et al. |
| 6,159,110 | A | 12/2000 | Sullivan et al. |
| 6,162,134 | A | 12/2000 | Sullivan et al. |
| 6,204,331 | B1 | 3/2001 | Sullivan et al. |
| 6,213,895 | B1 | 4/2001 | Sullivan et al. |
| 6,245,859 | B1 | 6/2001 | Sullivan et al. |
| 6,386,992 | B1 | 5/2002 | Harris et al. |
| 6,390,935 | B1 | 5/2002 | Sugimoto |
| 6,431,999 | B1 | 8/2002 | Nesbitt |
| 6,494,795 | B2 | 12/2002 | Sullivan |
| 6,520,872 | B2 | 2/2003 | Endo et al. |
| 6,569,035 | B2 | 5/2003 | Binette et al. |
| 6,634,962 | B2 | 10/2003 | Sullivan |
| 6,688,991 | B2 | 2/2004 | Sullivan et al. |
| 6,692,380 | B2 | 2/2004 | Sullivan et al. |
| 6,739,987 | B2 | 5/2004 | Harris et al. |
| 6,743,123 | B2 | 6/2004 | Sullivan |
| 6,767,294 | B2 | 7/2004 | Nesbitt |
| 6,852,042 | B2 | 2/2005 | Sullivan et al. |
| 6,939,249 | B2 | 9/2005 | Sullivan |
| 6,995,191 | B2 | 2/2006 | Sullivan et al. |
| 7,026,399 | B2 | 4/2006 | Kim et al. |
| 7,037,217 | B2 | 5/2006 | Harris et al. |
| 7,147,578 | B2 | 12/2006 | Nesbitt et al. |
| 7,160,208 | B2 | 1/2007 | Watanabe |
| 7,255,656 | B2 | 8/2007 | Sullivan et al. |
| 7,371,192 | B2 | 5/2008 | Sullivan et al. |
| 7,384,349 | B2 | 6/2008 | Sullivan et al. |
| 7,452,291 | B2 | 11/2008 | Sullivan et al. |
| 7,708,654 | B2 | 5/2010 | Sullivan et al. |
| 7,785,216 | B2 | 8/2010 | Hebert et al. |
| 7,935,004 | B2 | 5/2011 | Dalton et al. |
| 7,959,524 | B2 | 6/2011 | Nanba et al. |
| 8,272,971 | B2 | 9/2012 | Tutmark |
| 9,145,474 | B2 | 9/2015 | Arkles et al. |
| 10,293,216 | B2 | 5/2019 | Sullivan et al. |
| 2002/0034988 | A1 | 3/2002 | Binette |
| 2010/0081518 | A1* | 4/2010 | Sullivan ............ A63B 37/0043 473/376 |
| 2010/0323820 | A1* | 12/2010 | Sullivan ............ A63B 37/0043 473/376 |

OTHER PUBLICATIONS

Daniel Klempner and Kurt C. Firsh, eds., Handbook of Polymeric Foams and Foam Technology, (Munich, Vienna, New York, Barcelona: Hanser Publishers, 1991) pp. 330-336.

* cited by examiner

GOLF BALLS HAVING LAYERS MADE OF SILICONE ELASTOMERS

CROSS-REFERENCE TO RELATED APPLICATIONS

This application is a division of U.S. patent application Ser. No. 16/416,405, filed May 20, 2019, which is a division of U.S. patent application Ser. No. 15/290,175, filed Oct. 11, 2016, now U.S. Pat. No. 10,293,216, which is a continuation-in-part of U.S. patent application Ser. No. 15/181,723, filed Jun. 14, 2016, now U.S. Pat. No. 9,814,939, which is a continuation of U.S. patent application Ser. No. 14/071,819, filed Nov. 5, 2013, now U.S. Pat. No. 9,375,612, the entire disclosures of which are hereby incorporated herein by reference.

BACKGROUND OF THE INVENTION

Field of the Invention

The present invention relates generally to multi-layered, golf balls having layers made of foamed and non-foamed compositions. In one embodiment, a dual-layered core has a silicone foam inner core (center) and surrounding thermoset or thermoplastic outer core layer. In another embodiment, a three-layered core having at least one layer made from a non-foamed silicone elastomer composition is prepared. In yet another embodiment, a two-layered cover having at least one layer made from a non-foamed silicone elastomer composition is prepared.

Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

In recent years, three-piece, four-piece, and even five-piece balls have become more popular. These multi-piece balls have become more popular for several reasons including new manufacturing technologies, lower material costs, and desirable ball playing performance properties. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a single or multi-layered cover to provide a final ball assembly. Different materials can be used to manufacture the core and cover and impart desirable properties to the finished ball.

In general, dual-cores comprising an inner core (or center) and a surrounding outer core layer are known in the industry. For example, Sugimoto, U.S. Pat. No. 6,390,935 discloses a three-piece golf ball comprising a core having a center and outer shell and a cover disposed about the core. The specific gravity of the outer shell is greater than the specific gravity of the center. The center has JIS-C hardness (X) at the center point and JIS-C hardness (Y) at a surface point satisfying the equation: (Y−X)≥8. The core structure (center and outer shell) has JIS-C hardness (Z) at a surface of 80 or greater. The cover has a Shore D hardness of less than 60.

Endo, U.S. Pat. No. 6,520,872 discloses a three-piece golf ball comprising a center, an intermediate layer formed over the center, and a cover formed over the intermediate layer. The center is preferably made of high-cis polybutadiene rubber; and the intermediate and cover layers are preferably made of an ionomer resin such as an ethylene acid copolymer.

Watanabe, U.S. Pat. No. 7,160,208 discloses a three-piece golf ball comprising a rubber-based inner core; a rubber-based outer core layer; and a polyurethane elastomer-based cover. The inner core layer has JIS-C hardness of 50 to 85; the outer core layer has JIS-C hardness of 70 to 90; and the cover has Shore D hardness of 46 to 55. Also, the inner core has a specific gravity of more than 1.0, and the core outer layer has a specific gravity equal to or greater than that of that of the inner core.

The core structure as an engine or spring for the golf ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired from an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance as opposed to balls with low COR values. These properties are particularly important for long distance shots. For example, balls having high resiliency and COR values tend to travel a far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

Manufacturers of golf balls are constantly looking to different materials for improving the playing performance and other properties of the ball. For example, golf balls containing cores made from foam compositions are generally known in the industry. Puckett and Cadorniga, U.S. Pat. Nos. 4,836,552 and 4,839,116 disclose one-piece, short distance golf balls made of a foam composition comprising a thermoplastic polymer (ethylene acid copolymer ionomer such as Surlyn®) and filler material (microscopic glass bubbles). The density of the composition increases from the center to the surface of the ball. Thus, the ball has relatively dense outer skin and a cellular inner core. According to the '552 and '116 Patents, by providing a short distance golf ball, which will play approximately 50% of the distance of a conventional golf ball, the land requirements for a golf course can be reduced 67% to 50%.

Gentiluomo, U.S. Pat. No. 5,104,126 discloses a three-piece golf ball (FIG. 2) containing a high density center (3) made of steel, surrounded by an outer core (4) of low density resilient syntactic foam composition, and encapsulated by an ethylene acid copolymer ionomer (Surlyn®) cover (5). The '126 Patent defines the syntactic foam as being a low density composition consisting of granulated cork or hollow spheres of either phenolic, epoxy, ceramic or glass, dispersed within a resilient elastomer.

Aoyama, U.S. Pat. Nos. 5,688,192 and 5,823,889 disclose a golf ball containing a core, wherein the core comprising an inner and outer portion, and a cover made of a material such as balata rubber or ethylene acid copolymer ionomer. The core is made by foaming, injecting a compressible material, gasses, blowing agents, or gas-containing microspheres into polybutadiene or other core material. According to the '889 Patent, polyurethane compositions may be used. The compressible material, for example, gas-containing compressible cells may be dispersed in a limited part of the core so that the portion containing the compressible material has a specific gravity of greater than 1.00. Alternatively, the compressible material may be dispersed throughout the entire core. In one embodiment, the core comprises an inner and outer portion. In another embodiment, the core comprises inner and outer layers.

Sullivan and Ladd, U.S. Pat. No. 6,688,991 discloses a golf ball containing a low specific gravity core, optional intermediate layer, and high specific gravity cover with Shore D hardness in the range of about 40 to about 80. The core is preferably made from a highly neutralized thermoplastic polymer such as ethylene acid copolymer which has been foamed.

Nesbitt, U.S. Pat. No. 6,767,294 discloses a golf ball comprising: i) a pressurized foamed inner center formed from a thermoset material, a thermoplastic material, or combinations thereof, a blowing agent and a cross-linking agent and, ii) an outer core layer formed from a second thermoset material, a thermoplastic material, or combinations thereof. Additionally, a barrier resin or film can be applied over the outer core layer to reduce the diffusion of the internal gas and pressure from the nucleus (center and outer core layer). Preferred polymers for the barrier layer have low permeability such as Saran® film (poly (vinylidene chloride), Barex® resin (acyrlonitrile-co-methyl acrylate), poly (vinyl alcohol), and PET film (polyethylene terephthalate). The '294 Patent does not disclose core layers having different hardness gradients.

Sullivan, Ladd, and Hebert, U.S. Pat. No. 7,708,654 discloses a golf ball having a foamed intermediate layer. Referring to FIG. 1 in the '654 Patent, the golf ball includes a core (12), an intermediate layer (14) made of a highly neutralized polymer having a reduced specific gravity (less than 0.95), and a cover (16). According to the '654 Patent, the intermediate layer can be an outer core, a mantle layer, or an inner cover. The reduction in specific gravity of the intermediate layer is caused by foaming the composition of the layer and this reduction can be as high as 30%. The '654 Patent discloses that other foamed compositions such as foamed polyurethanes and polyureas may be used to form the intermediate layer.

Tutmark, U.S. Pat. No. 8,272,971 is directed to golf balls containing an element that reduces the distance of the ball's flight path. In one embodiment, the ball includes a core and cover. A cavity is formed between core and cover and this may be filled by a foamed polyurethane "middle layer" in order to dampen the ball's flight properties. The foam of the middle layer is relatively light in weight; and the core is relatively heavy and dense. According to the '971 Patent, when a golfer strikes the ball with a club, the foam in the middle layer actuates and compresses, thereby absorbing much of the impact from the impact of the ball.

Although some foam core constructions for gold balls have been considered over the years, there are drawbacks with using many foam materials. For example, one drawback with some polyurethane foams is they may have relatively low thermal-stability. That is, some of these foam compositions do not have good heat-resistance and may degrade when exposed to high temperatures. To make finished golf balls containing foam cores, a thermoplastic or thermoset composition, for example, polybutadiene rubber, is molded over the foam material. In such molding operations, a substantial level of heat and pressure is applied to the core structure. If the foam inner core does not have good thermal-stability, the foam may collapse on itself. The chemical and physical properties of the foam composition may change and the properties of the resulting golf ball core may be adversely affected. For example, there may be a negative impact on the size, resiliency, and stiffness of the foam core.

In view of some of the disadvantages with some golf ball foam cores, it would be desirable to have foam cores with high heat stability. The foam cores also should have good resiliency, rebounding performance, and durability. The present invention provides new foam core compositions and constructions having such properties as well as other advantageous features and benefits. The present invention also provides silicone elastomer compositions having high elongation, tensile strength, chemical/fluid-resistance, and weatherability properties. These compositions can be used to form any layer (for example, core, intermediate, or cover) in the golf ball. The invention also encompasses golf balls containing such improved core, intermediate, and cover layer constructions.

SUMMARY OF THE INVENTION

The present invention provides a multi-piece golf ball comprising a solid core assembly having at least one layer and a cover having at least one layer. In one version, the golf ball includes: i) an inner core (center), preferably formed from a polybutadiene rubber composition; ii) an inner cover layer comprising a non-foamed silicone elastomer composition, and iii) an outer cover layer disposed about the inner cover layer. Preferably, the silicone elastomer composition is formed using at least one heterobifunctional macromer, and the composition has an elongation greater than 2000%, more preferably greater than 3000%. The inner cover layer preferably has a midpoint hardness in the range of about 10 to about 60 Shore A. The outer cover layer preferably has a surface hardness in the range of about 55 to about 75 Shore D. In one preferred embodiment, the inner cover layer has a midpoint hardness in the range of about 25 to about 54 Shore A; and the outer cover layer has a surface hardness in the range of about 58 to about 71 Shore A. Preferably, the surface hardness of the outer cover layer is greater than the midpoint hardness of the inner cover layer. In another embodiment, the midpoint hardness of the inner cover layer formed from the silicone elastomer composition is greater than the surface hardness of the outer cover layer. For example, the silicone elastomer inner cover may have a midpoint hardness in the range of about 50 to about 75 Shore A; and the outer cover layer may have a surface hardness in the range of about 20 to about 60 Shore D.

Thermoset or thermoplastic materials are used to form the inner core and outer cover layers of the golf balls in the present invention. In one embodiment, the core comprises an inner core and surrounding outer core layer, and at least one of the core layers is formed from a rubber composition. In one embodiment, the outer cover layer is formed from an ethylene acid copolymer ionomer, wherein less than 70% or greater than 70% of the acid groups have been neutralized. In another embodiment, the outer cover layer is formed from polyurethanes, polyureas, polyurethane-urea hybrids, and copolymers and blends thereof.

In yet another embodiment, a golf ball comprising an inner core layer, intermediate core layer, and outer core layer can be made. The inner core layer may comprise a thermoset rubber composition or a thermoplastic composition such as an ethylene acid copolymer ionomer and have a diameter in the range of about 0.100 to about 1.1000 inches. The inner core preferably has a positive hardness gradient. The intermediate core layer may comprise a non-foamed silicone elastomer composition and have a thickness in the range of about 0.050 to about 0.400 inches. In one embodiment, the intermediate core layer has a zero or negative hardness gradient. In another embodiment, the intermediate core layer has a positive hardness gradient. The outer core layer may comprise a thermoset rubber composition or a thermoplastic composition and have a diameter in the range of about 0.200 to about 0.750 inches. The outer core layer also can have a zero/negative hardness gradient or a positive hardness gradient.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Figure 1:
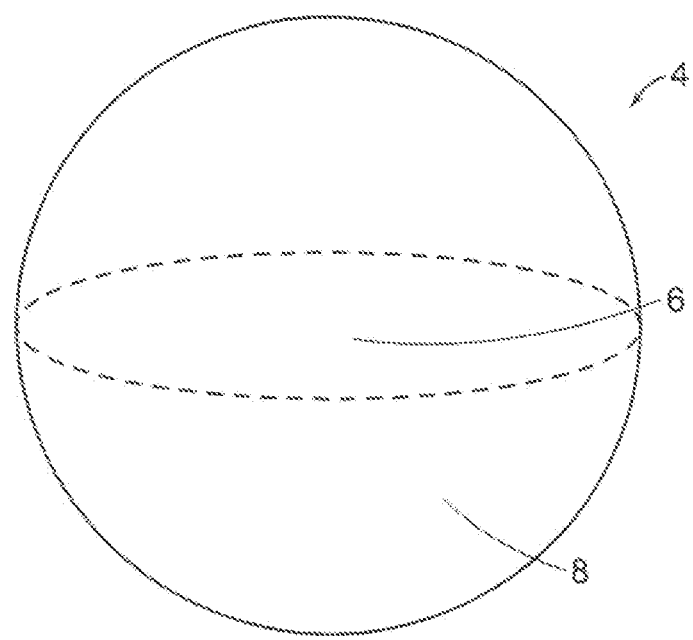
FIG. 1 is a perspective view of a spherical inner core made of a foamed composition in accordance with the present invention.

Golf balls having various constructions may be made in accordance with this invention. For example, golf balls having three piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a three-piece golf ball containing a dual-layered core and single-layered cover is made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball.

Inner Core Composition

In general, silicone foam compositions are made by forming gas bubbles in a polymer mixture using a foaming (blowing) agent. As the bubbles form, the mixture expands and forms a foam composition that can be molded into an end-use product having either an open or closed cellular structure. Flexible foams generally have an open cell structure, where the cells walls are incomplete and contain small holes through which liquid and air can permeate. Such flexible foams are used traditionally for automobile seats, cushioning, mattresses, and the like. Rigid foams generally have a closed cell structure, where the cell walls are continuous and complete, and are used for used traditionally for automobile panels and parts, building insulation and the like. Many foams contain both open and closed cells. It also is possible to formulate flexible foams having a closed cell structure and likewise to formulate rigid foams having an open cell structure.

As described in Daniel Klempner and Kurt C. Firsch, eds., *Handbook of Polymeric Foams and Foam Technology*, (Munich, Vienna, New York, Barcelona: Hanser Publishers, 1991), silicone foams are generally produced by the condensation reaction between SiH and SiOH as shown below.

When these two components are mixed together, they generate hydrogen gas which causes bubbles to form within the composition. The gas becomes trapped in cells to produce foam. During the curing step, the "liquid foam" (mixed liquid reactants) are transformed into a solid material. These reactions can occur at room temperature, when the three necessary components (SiH-containing cross-linker, SiOH-containing polymer, and catalyst) are mixed together. These foams can be considered two-part systems (the SiH-containing cross-linker makes up one component; and the SiOH-containing polymer and catalyst make-up the second component.) A variety of catalysts including tin, zinc, and platinum-based compounds, can be used to promote these reactions.

In the present invention, the inner core (center) comprises a lightweight foam silicone composition. The foam may have an open or closed cellular structure or combinations thereof and the foam structure may range from a relatively rigid foam to a very flexible foam. Referring to FIG. 1, a foamed inner core (4) having a geometric center (6) and outer skin (8) may be prepared in accordance with this invention.

As discussed above, hydrogen gas, which evolves as during the reactions, is the most common foaming (blowing) agent used to make silicone foam. However, other foaming agents may be introduced into the polymer formulation to generate the foam cells. In general, there are two types of foaming agents: physical foaming agents and chemical foaming agents.

Physical foaming agents. These foaming agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable.

Chemical foaming agents. These foaming agents typically are in the form of powder, pellets, or liquids and they are added to the composition, where they decompose or react during heating and generate gaseous by-products (for example, nitrogen or carbon dioxide). The gas is dispersed and trapped throughout the composition and foams it.

Hydroxyl-containing materials that react with some of the SiH-containing cross-linker during the silicone-forming reaction are preferred blowing agents. Different sources of hydroxyl groups may be used including water and alcohols. Hydroxyl-containing polysiloxanes also can be used. Other chemical blowing agents include inorganic compounds, such as ammonium carbonate and carbonates of alkalai metals, or may organic compounds, such as azo and diazo compounds, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. As discussed above, other hydroxyl-containing materials such as water and alcohol-based materials may be used.

Commercially-available silicone foam compositions that can be used in accordance with this invention include, for example, silicone foams available from Dow Corning Corp. (Midland, Mich.); Rogers Corp (Carol Stream, Ill.); and Saint Gobain Performance Plastics (Hoosick Falls, N.Y.). In addition to the foaming agent as discussed above, the foam composition also may include other ingredients such as, for example, fillers, cross-linking agents, chain extenders, surfactants, dyes and pigments, coloring agents, fluorescent agents, adsorbents, stabilizers, softening agents, impact modifiers, antioxidants, antiozonants, and the like.

Fillers. The silicone foam composition may contain fillers such as, for example, mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. Silicon dioxides are particularly preferred because they are based on Si—O bonds and these materials are compatible with the Si—O—Si backbone of the silicone foam. Adding fillers to the composition provides many benefits including helping improve the stiffness and strength of the composition. The mineral fillers tend to help decrease the size of the foam cells and increase cell density. The mineral fillers also tend to help improve the physical properties of the foam such as hardness, compression set, and tensile strength.

More particularly, clay particulate fillers, such as Garamite® mixed mineral thixotropes and Cloisite® and Nanofil® nanoclays, commercially available from Southern Clay Products, Inc., and Nanomax® and Nanomer® nanoclays, commercially available from Nanocor, Inc may be used. Other nano-scale materials such as nanotubes and nanoflakes also may be used. Also, talc particulate (e.g., Luzenac HAR® high aspect ratio talcs, commercially available from Luzenac America, Inc.), glass (e.g., glass flake, milled glass, and microglass), and combinations thereof may be used. Metal oxide fillers have good heat-stability and include, for example, aluminum oxide, zinc oxide, tin oxide, barium sulfate, zinc sulfate, calcium oxide, calcium carbonate, zinc carbonate, barium carbonate, tungsten, tungsten carbide, and lead silicate fillers. These metal oxides and other metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be added to the silicone foam composition.

Surfactants. The silicone foam composition also may contain surfactants to stabilize the foam and help control the foam cell size and structure. In one preferred version, the foam composition includes silicone surfactant which is very compatible with the silicone foam system. In general, the silicone surfactant helps regulate the foam cell size and stabilizes the cell walls to prevent the cells from collapsing. As discussed above, the liquid reactants react to form the foam rapidly. The "liquid" foam develops into solid silicone foam in a relatively short period of time. If a silicone surfactant is not added, the gas-liquid interface between the liquid reactants and expanding gas bubbles may not support the stress. As a result, the cell window can crack or rupture and there can be cell wall drainage. In turn, the foam can collapse on itself. Adding a silicone surfactant helps create a surface tension gradient along the gas-liquid interface and helps reduce cell wall drainage. The silicone surfactant has a relatively low surface tension and thus can lower the surface tension of the foam. It is believed the silicone surfactant orients itself the foam cell walls and lowers the surface tension to create the surface tension gradient. Blowing efficiency and nucleation are supported by adding the silicone surfactant and thus more bubbles are created in the system. The silicone surfactant also helps create a greater number of smaller sized foam cells and increases the closed cell content of the foam due to the surfactant's lower surface tension. Thus, the cell structure in the foam is maintained as the as gas is prevented from diffusing out through the cell walls. Along with the decrease in cell size, there is a decrease in thermal conductivity. The resulting foam material also tends to have greater compression strength and modulus. These improved physical properties may be due to the increase in closed cell content and smaller cell size.

As discussed further below, in one preferred embodiment, the specific gravity (density) of the foam inner core is less than the specific gravity of the outer core. If mineral filler or other additives are included in the foam composition, they should not be added in an amount that would increase the specific gravity (density) of the foam inner core to a level such that it would be greater than the specific gravity of the outer core layer. If the ball's mass is concentrated towards the outer surface (for example, outer core layers), and the outer core layer has a higher specific gravity than the inner core, the ball has a relatively high Moment of Inertia (MOI). In such balls, most of the mass is located away from the ball's axis of rotation and thus more force is needed to generate spin. These balls have a generally low spin rate as the ball leaves the club's face after contact between the ball and club. Such core structures (wherein the specific gravity of the outer core is greater than the specific gravity of the inner core) is preferred in the present invention. Thus, in one preferred embodiment, the concentration of mineral filler particulate in the foam composition is in the range of about 0.1 to about 9.0% by weight.

Properties of Silicone Foams

The silicone foam compositions of this invention have numerous chemical and physical properties making them suitable for core assemblies in golf balls.

The density of the foam is an important property and is defines as the weight per unit volume (typically, g/cm$^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are not necessarily soft and flexible, rather, they may be relatively firm, rigid, or semi-rigid depending upon the desired golf ball properties. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required to compress the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

In addition, the silicone foams have high thermal-stability. Thus, the foam can resist changes to its structure and physical properties as the temperature increases. The silicone foam can withstand high temperature for extended time periods without substantial decreases in chemical and physical properties. In general, many silicone foams can withstand temperatures in the range of about −100° F. (73° C.) to about 500° F. (260° C.). These heat-resistant properties are particularly important during the molding operation, where substantial heat and pressure are applied to the mold cavities and molding process temperatures may vary over a wide range. As discussed further below, an outer core thermoplastic or thermoset layer is molded over the silicone foam core. A single or multi-layered cover is molded over this core structure. During these molding steps, it is important the core composition does not melt or thermally degrade. The foam composition must be able to hold-up under high temperatures so that its chemical and physical properties are not adversely affected. The cores comprising the silicone foam compositions of this invention have high heat-stability. The cores show improved heat-stability without sacrificing properties such as resiliency and durability.

The thermal stability of the above silicone foam composition can be measured by thermogravimetry. Preferably, the foam composition has a weight loss at 250° C., based on the weight of the mixture at 25° C., of preferably not more than 5 wt. %, more preferably not more than 4 wt. %, and even more preferably not more than 1 wt. %.

It should be noted that silicone sponge rubber, silicone solid rubber, and silicone foam rubber are different materials having different properties and appearances. In general, manufacturing silicone sponge and solid rubber involves processing a gum-type silicone material through hard-pressure calendar rollers. The silicone material is then run through a curing apparatus that continuously vulcanizes the sponge rubber. Such silicone sponge and solid rubber materials are described in Sullivan, Keller, and Binette, U.S. Pat. No. 7,384,349. In contrast, silicone foam rubber is made from liquid components that are mixed together and cured.

As discussed above, to make silicone foam rubber, the first component (Component A) generally consists of SiOH-containing compound and catalyst; and the second component (Component B) generally consists of the SiH-containing compound. These liquid components are metered to a mixing chamber, where the components are mixed using a mechanical mixer or static mixer. Alternatively, the components can be manually mixed together. An exothermic reaction occurs when the ingredients are mixed together and this continues as the reactive mixture is dispensed into the mold cavities (otherwise referred to as half-molds or mold cups).

The mold cavities may be referred to as first and second, or upper and lower, mold cavities. The mold cavities preferably are made of metal such as, for example, brass or silicon bronze.

Figure 2:
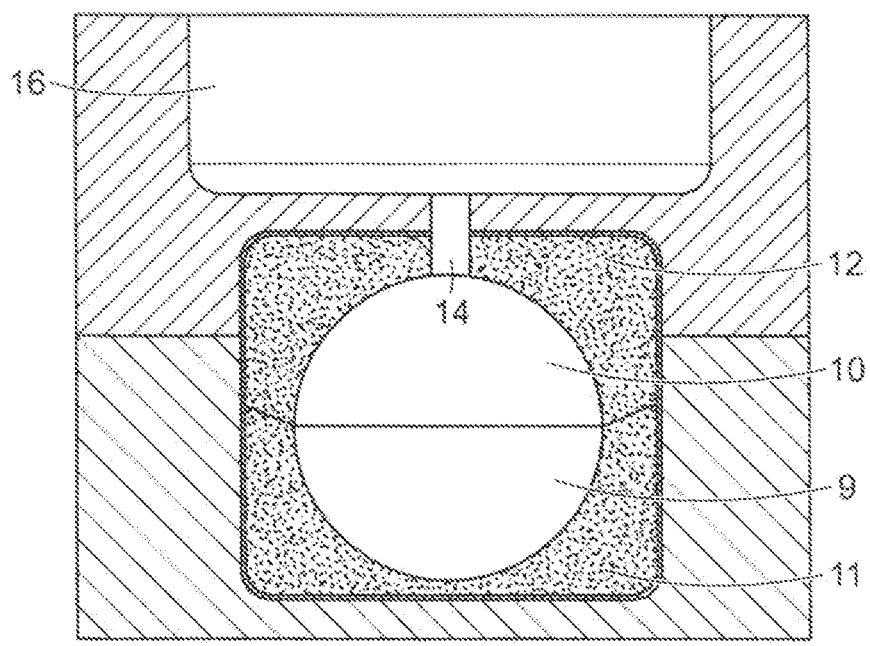
FIG. 2 is a perspective view of one embodiment of upper and lower mold cavities used to make the dual-layered cores of the present invention.

Referring to FIG. 2, the mold cavities are generally indicated at (9) and (10). The lower and upper mold cavities (9, 10) are placed in lower and upper mold frame plates (11, 12). The frame plates (11, 12) contain guide pins and complementary alignment holes (not shown in drawing). The guide pins are inserted into the alignment holes to secure the lower plate (11) to the upper plate (12). The lower and upper mold cavities (9, 10) are mated together as the frame plates (11, 12) are fastened. When the lower and upper mold cavities (9, 10) are joined together, they define an interior spherical cavity that houses the spherical core. The upper mold contains a vent or hole (14) to allow for the expanding foam to fill the cavities uniformly. A secondary overflow chamber (16), which is located above the vent (14), can be used to adjust the amount of foam overflow and thus adjust the density of the core structure being molded in the cavities. As the lower and upper mold cavities (9, 10) are mated together and sufficient heat and pressure is applied, the foamed composition cures and solidifies to form a relatively rigid and lightweight spherical core. The resulting cores are cooled and then removed from the mold.

Both the silicone sponge rubber and silicone foam rubber are cellular in nature. However, the silicone sponge rubber tends to have a higher density, higher tensile strength, and higher material weight versus the silicone foam rubber. Because the silicone foam rubber generally contains more air, it is generally softer and lower in density than silicone sponge rubber. The silicone foam rubber also has better compression set properties than the silicone sponge rubber.

Non-Foam Silicones

Non-Foam silicone compositions also may be used in accordance with the present invention. In general, non-foam silicone polymers are available in a wide variety of forms including, for example, fluids, elastomers/rubbers, gels, resins, and mixtures thereof. The silicone polymers are based on a structure consisting of alternate silicon and oxygen atoms with various organic radicals attached to the silicon atom (for example, R1 and R2 can be methyl, vinyl, phenyl, or other groups) and the molecular weight of the silicone can vary based on the type of product (for example, n can be in the range of 100 to 15,000) as shown in the structure below:

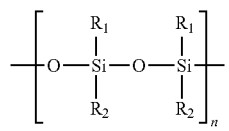

In general, non-foam silicones have many desirable properties including good thermal and oxidative stability. The non-foam silicones are stable over a wide range of temperature. These silicones have good chemical/fluid-resistance, water-repellency, and can withstand different weathering elements. The high stability and binding energy of the siloxane bonds (—Si—O—Si—) helps impart these properties to these silicones. The silicones can be in the form of liquids, semisolids, or solids depending on molecular weight and degree of polymerization. The molecular structure of the silicones can vary and include linear, branched, cyclic, and cross-linked structures.

In one preferred embodiment, a non-foam silicone elastomer is used in accordance with this invention. The non-foam silicone elastomer is generally formed by reacting a silicone polymer and cross-linking agent. The non-foamed silicone elastomer typically also contains fillers. The production of non-foamed silicone elastomers and their resulting properties are described further below.

The non-foam silicone compositions of this invention may be used in one or more core, intermediate, or cover layers. For instance, in a three-layered core structure, the non-foam silicone elastomer composition may be used to form the innermost core or center layer, or intermediate core layer, or outermost core layer. In another example, in a four-piece ball having a dual-layered core and dual-layered cover (inner and outer cover layers), the silicone-comprising composition may be used to form the inner cover layer. The silicone-comprising compositions are thermoplastic and may be used to form layers that are adjacent to another layer made from a thermoplastic composition or may be adjacent to a layer made from a thermosetting composition. For example, in a three (3) or more layered-core construction, the center may be made from a thermosetting rubber composition, the intermediate core layer may comprise the silicone-based composition, and the outer core layer may be made from a thermosetting rubber composition. Alternatively, the center and intermediate core layer may comprise a thermosetting rubber and the outer core layer may comprise the thermoplastic silicone-based composition, and the like. These different embodiments are described further below.

The non-foam silicone elastomers also may be used as an additive in thermoset rubber compositions used to make core, cover, or other layers of the golf ball of this invention. Suitable rubber compositions that can be used to make such core or other layers include, for example, polybutadiene, polyisoprene, ethylene propylene rubber ("EPR"), ethylene-propylene-diene ("EPDM") rubber, and styrene-butadiene rubber and these rubbers are described further below. The silicone elastomer is preferably added to the thermoset rubber composition in an amount of 1 to 80 parts per hundred (pph).

Furthermore, the non-foam silicone elastomers may be used to modify thermoplastic polymer compositions that are used to make core, cover, or other layers. For example, the non-foam silicone elastomers may be added to thermoplastic polyurethane (TPU) compositions.

Core Construction

As discussed above, in some examples, thermoplastic and thermoset materials may be used to construct core assemblies having three layers as described in the following Table I. In these examples, a thermoset material is used to form the inner core (center) and the silicone composition of this invention is preferably used to form the intermediate and/or outer core layers.

TABLE I

Thermoset Inner Core in Three-Layered Core Assemblies

| Inner Core | Intermediate Core Layer | Outer Core Layer |
| --- | --- | --- |
| Thermoset material | Non-Foam Silicone material | Thermoset material |
| Thermoset material | Thermoset material | Non-Foam Silicone material |
| Thermoset material | Non-Foam Silicone material | Thermoplastic material |
| Thermoset material | Thermoplastic material | Non-Foam Silicone material |

In yet other examples, the thermoplastic and thermoset materials may be used to construct core assemblies having three layers as described in the following Table II. In these examples, a thermoplastic material is used to form the inner core (center) and the silicone composition of this invention is preferably used to form the intermediate and/or outer core layers.

TABLE II

Thermoplastic Inner Core in Three-Layered Core Assemblies

| Inner Core | Intermediate Core Layer | Outer Core Layer |
| --- | --- | --- |
| Thermoplastic material | Non-Foam Silicone material | Thermoset material |
| Thermoplastic material | Non-Foam Silicone material | Thermoplastic material |
| Thermoplastic material | Thermoplastic material | Non-Foam Silicone material |
| Thermoplastic material | Thermoset material | Non-Foam Silicone material |

In another example, where a three-layered cover construction is used, the non-foam silicone composition can be used to form an inner, or intermediate, or outermost cover layer. For example in a golf ball having a three-layered cover, the silicone-based composition may be used to form any of the three layers, but preferably is used to form the inner or intermediate cover layer, or both. In a three-piece ball having a dual-layered core (inner core and outer core layers) and surrounding outer cover, the silicone-based composition may be used to form the outer core layer. In a two-piece construction comprising a core and a cover, either the core or cover or both layers may consist of the silicone-based composition.

In yet other example, the foamed silicone composition of this invention is used to form one layer, for example, the inner core of the golf ball; and the non-foamed silicone elastomer composition of this invention is used to form a second layer, for example, the inner cover of the golf ball. The foamed silicone composition and non-foamed silicone elastomer compositions also can be used to form adjoining layers in the golf ball (for example, inner core and intermediate core layers in a multi-layered core construction.) The foamed silicone and non-foamed silicone elastomer compositions of this invention can be used to form any layer(s) in the golf ball construction.

Figure 5:
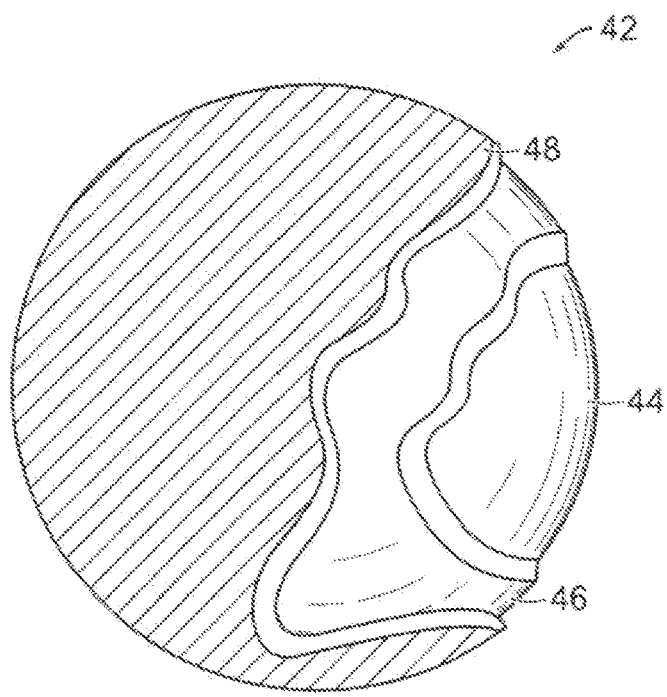
FIG. 5 is a partial cut-away perspective view of a three-layered core having inner, intermediate, and outer core layers made in accordance with the present invention.
Figure 6:
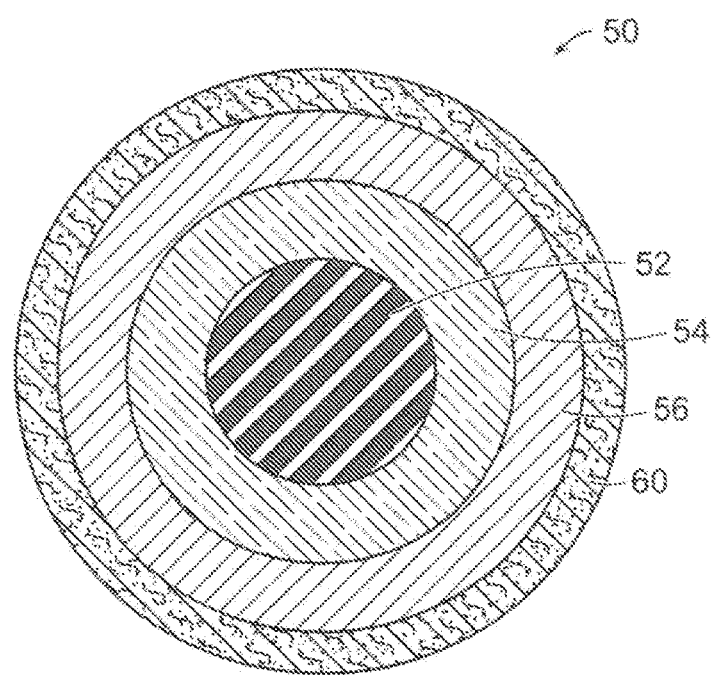
FIG. 6 is a cross-sectional view of a four-piece golf ball having a three-layered core and single-layered cover made in accordance with the present invention.

As discussed above, the core preferably has a multi-layered structure comprising an inner core, intermediate core layer, and outer core layer. In FIG. 5, a partial cut-away view of one version of the core (42) of this invention is shown. The core (42) includes an inner core (44) comprising a thermoset composition; an intermediate core layer (46) comprising the non-foam silicone elastomer composition of this invention; and an outer core layer (48) comprising a thermoset composition. As shown in FIG. 5, the intermediate core layer (46) is disposed about the inner core (44), and the outer core layer (48) surrounds the intermediate core layer. The hardness of the core sub-assembly (inner core, intermediate core layer, and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained. In FIG. 6, a cross-sectional view of one version of a four-piece golf ball (50) that can be made in accordance with this invention is illustrated. The ball (50) contains a multi-layered core having an inner core (52), intermediate core layer (54), and outer core layer (56) surrounded by a single-layered cover (60).

As described in the above Tables, in one embodiment, the inner core and outer core layers comprise thermoset materials, while the intermediate core layer comprises the silicone composition of this invention. Suitable thermoset materials that may be used to form the inner core and outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Other additives and fillers for the rubber compositions are described further below. The thermoset rubber materials may be cured using a conventional curing process also described further below. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof.

In other embodiments, also as described in the above Tables, thermoplastic materials such as highly-neutralized polymer compositions (HNPs) may be used to form any core layer in accordance with the present invention. In one embodiment, the inner core and outer core layers comprise thermoplastic materials, while the intermediate core layer comprises the silicone composition of this invention. Suitable HNP compositions comprise an HNP and optionally melt-flow modifier(s), additive(s), and/or filler(s). For purposes of the present disclosure, "HNP" refers to an acid polymer after at least 70%, preferably at least 80%, more preferably at least 90%, more preferably at least 95%, and even more preferably 100%, of the acid groups present are neutralized. HNPs are discussed further below. It is understood that the HNP may be a blend of two or more HNPs. Preferred acid polymers are copolymers of an α-olefin and a $C_3$-$C_5$ α,β-ethylenically unsaturated carboxylic acid, optionally including a softening monomer. The α-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. The optional softening monomer is preferably selected from alkyl (meth) acrylate, wherein the alkyl groups have from 1 to 8 carbon atoms. Preferred acid copolymers include, but are not limited to, those wherein the α-olefin is ethylene, the acid is (meth) acrylic acid, and the optional softening monomer is selected from (meth) acrylate, n-butyl (meth) acrylate, isobutyl (meth) acrylate, methyl (meth) acrylate, and ethyl (meth) acrylate. Particularly preferred acid copolymers include, but are not limited to, ethylene/(meth) acrylic acid/n-butyl acrylate, ethylene/(meth) acrylic acid/methyl acrylate, and ethylene/(meth) acrylic acid/ethyl acrylate.

The inner core preferably has a diameter in the range of about 0.100 to about 1.250 inches. For example, the inner core may have a diameter within a range of about 0.100 to about 1.100 inches. In another example, the inner core may have a diameter within a range of about 0.300 to about 0.800 inches. In yet another example, the inner core may have a diameter within a range of about 1.000 to about 1.250 inches. Meanwhile, the intermediate core layer preferably has a thickness in the range of about 0.010 to about 0.095 inches. More particularly, in one example, the thickness of the intermediate core layer is within a range of about 0.025 to about 0.065 inches. In another embodiment, the intermediate core layer has a thickness within a range of about 0.030 to about 0.060 inches. As far as the outer core layer is concerned, it preferably has a thickness in the range of about 0.100 to about 0.750 inches. For example, the outer core layer may have a thickness in the range of about 0.200 to about 0.600 inches or about 0.300 to about 0.500 inches. The overall diameter of the core sub-assembly (inner, intermediate, and outer core layers) is preferably in the range of about 1.450 to about 1.700 inches, or is preferably in the range of about 1.450 to about 1.620 inches.

The inner core preferably has a geometric center hardness ($H_{inner\ core\ center}$) of about 20 Shore C or greater; for example, the $H_{inner\ core\ center}$ may have a hardness in the range of about 20 to about 85 Shore C. In another example, the hardness is in the range of about 30 to about 70 Shore C or more particularly in the range of about 40 to about 60 Shore C. Concerning the outer surface hardness of the inner core ($H_{inner\ core\ surface}$), this hardness is preferably about 25 to about 90 Shore C. In one example, the $H_{inner\ core\ surface}$ is in the range of about 40 to about 80 Shore C, and more particularly in the range of about 50 to about 75 Shore C.

Meanwhile, the intermediate core layer preferably has an outer surface hardness ($H_{outer\ surface\ of\ the\ Inter\ Core}$) of about 20 Shore D or greater, and more particularly within a range of about 20 to about 55 Shore D. Preferably, the $H_{outer\ surface\ of\ the\ Inter\ Core}$ is less than 55 Shore D and in the range of about 20 to 50 Shore D, more particularly in the range of about 25 to about 45 Shore D. The outer surface hardness of the intermediate core layer ($H_{outer\ surface\ of\ the\ Inter\ Core}$), as measured in Shore C units, preferably has a lower limit of about 30 Shore C, and an upper limit of about 85 Shore C. Preferably, the $H_{outer\ surface\ of\ the\ Inter\ Core}$ is less than 85 Shore C and in the range of about 30 to 80 Shore C, more particularly in the range of about 40 to about 75 Shore C. While, the midpoint (or inner surface) hardness of the intermediate core ($H_{midpoint\ of\ the\ Inter\ Core}$) preferably is about 25 Shore D or greater and more preferably is within a range of about 25 to about 60 Shore D. As measured in Shore C units, the midpoint hardness of the intermediate core ($H_{midpoint\ of\ the\ Inter\ Core}$) preferably has a lower limit of about 35 Shore C and an upper limit of about 90 Shore C. The outer surface hardness of the intermediate core layer ($H_{outer\ surface\ of\ the\ Inter\ Core}$), as measured in Shore A units, preferably has a lower limit of about 10 Shore A, and an upper limit of about 90 Shore A. While, the midpoint (or inner surface) hardness of the intermediate core ($H_{midpoint\ of\ the\ Inter\ Core}$) also preferably has a hardness with a lower limit of about 10 Shore A, and an upper limit of about 90 Shore A.

In one preferred example, the intermediate core layer is formed from a silicone elastomer composition. The intermediate layer has an outer surface hardness and midpoint hardness. In this intermediate core layer, the outer surface hardness can be the same or less than the midpoint hardness to provide a zero or negative hardness gradient. For example, the midpoint hardness can be in the range of about 37 to about 80 Shore A, or about 50 to about 70 Shore A; and the outer surface hardness can be in the range of about 30 to about 73 Shore A, or about 40 to about 60 Shore A to provide a zero or negative hardness gradient across the intermediate core. Alternatively, in this intermediate core layer, the outer surface hardness can be greater than the midpoint hardness to provide a positive hardness gradient. For example, the midpoint hardness can be in the range of about 15 to about 80 Shore A, or about 20 to about 70 Shore A, or about 40 to about 62 Shore A; and the outer surface hardness can be in the range of about 27 to about 87 Shore A, or about 50 to about 70 Shore A to provide a positive hardness gradient across the intermediate core.

On the other hand, the outer core layer preferably has an outer surface hardness ($H_{outer\ surface\ of\ OC}$) of about 40 Shore D or greater, and more preferably within a range of about 40 to about 80 Shore D. The outer surface hardness of the outer core layer ($H_{outer\ surface\ of\ OC}$), as measured in Shore C units, preferably has a lower limit of about 45 Shore C, and an upper limit of about 85 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 42 and an upper limit of about 82 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 44 and an upper limit of about 80 Shore C.

The midpoint of a core layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, in one preferred version, the inner core is formed from a polybutadiene rubber or other thermoset rubber composition and the outer core layer is formed from a polybutadiene rubber or other thermoset rubber composition. In another preferred version, the inner and outer core layers are each formed from a thermoplastic composition, particularly an ethylene acid copolymer ionomer composition.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, and compositions of the inner core, intermediate core, and outer core layers.

Cover Construction

In another version, the inner cover layer is formed from the silicone-based composition of this invention, and the outer cover layer is formed from a suitable thermoset or thermoplastic composition. In such instances, suitable materials that can be used to form the outer cover layer include, for example, polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® 10 ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable. When used as the outer cover layer material, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one particularly preferred version, a two-layered cover is made. For example, a cover assembly having inner and outer cover layers, wherein a relatively hard outer cover is disposed about a relatively soft inner cover may be made. Alternatively, a relatively soft outer cover may be disposed about a relatively hard inner cover. The non-foamed silicone-based composition of this invention may be used to form at least one of the cover layers. Other thermoplastic or thermoset compositions as described above may be used to form the other cover layer in the two-layered cover assembly.

The thickness of the silicone-based inner cover is preferably in the range of about 0.010 to about 0.075 inches, more preferably about 0.015 to about 0.045 inches, and most preferably about 0.020 to about 0.040 inches. As discussed above, in one version, the silicone-based inner cover can have a midpoint hardness in the range of about 10 to about 90 Shore A or about 15 to about 60 Shore A, more preferably about 25 to about 54 Shore A; and the outer cover can have an outer surface hardness in the range of about 45 to about 80 Shore D or about 55 to about 75 Shore D, more preferably about 58 to about 71 Shore D, wherein the outer surface hardness of the outer cover layer is greater than midpoint hardness of the inner cover layer. The outer cover layer is preferably made of a blend of ethylene acid copolymer ionomers (for example, Surlyn™ 8940/7940) and preferably has a thickness of about 0.015 inches to about 0.020 to about 0.080 inches, more preferably about 0.030 to about 0.060 inches. In this embodiment, the hardness of the outer cover layer is preferably in the range of about 63 to about 67 Shore D. Surlyn™ 8940 is an E/MAA copolymer in which the acid groups have been partially neutralized with sodium ions. Surlyn™ 7940 is an E/MAA copolymer in which the acid groups have been partially neutralized with lithium ions.

In another version, the silicone-based inner cover can have a midpoint hardness in the range of about 10 to about 90 Shore A or about 15 to about 80 Shore A, or about 30 to about 70 Shore A more preferably about 35 to about 65 Shore A; and the outer cover can have an outer surface hardness in the range of about 10 to about 70 Shore D or about 15 to about 65 Shore D, more preferably about 20 to about 60 Shore D, wherein the outer surface hardness of the outer cover layer is less than midpoint hardness of the inner cover layer. Referring to FIG. 7, a five-piece golf ball (62) containing a three-layered core having an inner core (64), intermediate core (66), and outer core layer (68) is shown.

The multi-layered core is surrounded by a multi-layered cover having an inner cover layer (70) and outer cover layer (72).

In another particularly preferred version, a three-layered cover is made. For example, a cover assembly having inner and outer cover layers, wherein an intermediate cover layer is disposed between the inner and outer cover layers, may be prepared. In such a construction, the silicone-based compositions of this invention may be used to form at least one of the inner, intermediate, or outer cover layers.

Properties of Non-Foam Silicone Elastomers

In general, raw, uncured silicone rubber contains polymers of different chain lengths. Solid silicone rubber contains polymers of higher molecular weight and relatively long polymer chains. On the other hand, liquid silicone rubber contains polymers of lower molecular weight. A cross-linking mechanism such as peroxide-curing or platinum catalyst systems are used to convert the raw, uncured silicone rubber into stable cured silicone elastomer. Fillers are used to reinforce the elastic silicone network. Most silicone elastomer compositions are based on polydimethyl siloxanes having the general chemical structure shown below:

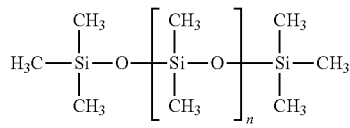

The value of n varies mainly with the type of product. For room-temperature-vulcanizing products, n is in the 200-1,500 range; for heat-cured products, n is approximately 3,000-11,000. The physical properties of silicone elastomers are generally determined by the degree of cross-linking in the material. Cross-linking silicone polymers of appropriate molecular weight provides elastomeric properties. Fillers increase strength through reinforcement, and extending fillers and additives, for example, antioxidants, adhesion promoters, and pigments, can be used to provide specific properties.

The silicone elastomers have good temperature-resistance—the elastomers can handle very low and very high temperatures (for example, in the range of −40° to 392° F.). The silicone elastomers are very flexible and are easy to process with good chemical/fluid-resistance. Also, the elastomers have good weatherability and in particular, they have good ozone and ultraviolet (UV) light-resistance.

Any suitable cross-linking system can be used for curing the silicone elastomers including, but not limited to the following: a) by free-radical crosslinking with, for example, benzoyl peroxide, through the formation of ethylenic bridges between chains; b) by cross-linking of vinyl or allyl groups attached to silicon through reaction with silylhydride groups; and c) by cross-linking linear or slightly branched siloxane chains having reactive end groups such as silanols. This yields Si—O—Si crosslinks. The latter mechanism forms the basis of the curing of room-temperature vulcanizing (RTV) silicone elastomers. These are available as two-part mixtures in which all three essential ingredients for the cure (silanol-terminated polymer, cross-linking agent such as ethyl silicate, and a catalyst such as a tin soap) are combined at the time the two components are mixed, and as one-part materials using a hydrolyzable polyfunctional silane or siloxane as crosslinker, activated by atmospheric moisture.

The silicone elastomers are preferably reinforced by finely divided fillers such as silica. For example, the finely divided silicas may be made by fume or wet processes. The fume process provides the highest degree of reinforcement. Accordingly, the particle size is small. The particle diameter should be about the length of a fully extended polymer chain, that is, about 1 μm, for semi-reinforcement and about 0.01-0.05 μm for strong reinforcement. The fillers can be treated to give it an organic or a silicone coating before mixing it with polymer. Hexamethyldisilazane, [(CH$_3$)Si]$_2$NH, is sometimes used as a coupling agent. Treating the silica particles with hot vapors of low molecular weight cyclic siloxanes reduces agglomeration and prevents premature crepe hardening. Non-reinforcing fillers, such as iron oxide or titanium dioxide, may be utilized to stabilize or color the resulting silicone material or to decrease the cost per unit volume.

Various silicone elastomers can be used in accordance with the present invention. For example, silicone elastomers commercially-available from Dow Corning under the series "Thermal Radical Cure" (TRC) adhesives can be used. More particularly, Dow Corning EA-7100™ silicone elastomer adhesive can be used. Other silicone polymers that can be used in accordance with the present invention include high-consistency silicone rubbers and liquid silicone rubber. Liquid silicone rubber (LSR) compounds are two-part silicone materials that can be mixed, pumped, and rapidly heat-cured to form elastomeric components. High-consistency rubber bases (HCR) can be blended with fillers, modifiers, vulcanizing agents, and pigments and heat-cured. The Degree of Polymerization (DP) and Molecular Weight (MW) of the LSR and HCR materials can vary. For example, the DP of the LSR materials can be in the range of 10 to 100; and the DP of the HCR materials can be in the range of 5,000 to 10,000. Also, for example, the MW of the LSR materials can be in the range of 900 to 7,600; and the MW of the HCR materials can be in the range of 370,000 to 740,000.

Typically, silicone elastomer materials have elongations of 100 to 1,000% and tensile strengths of 500 to 1,000 psi. As discussed above, raw silicone rubber is cured to form silicone elastomers having these elastomeric properties. Normally, peroxide-curing is used, where the peroxides decompose at elevated temperatures to form highly-reactive radicals. These peroxide radicals chemically cross-link the polymer chains. Platinum-catalyzed addition curing also can be used. In this curing process, the Si—H groups react with vinyl groups of the polymer to form a three-dimensional network.

In recent years, a new class of silicone elastomers with high elongation and shape-recovery abilities has been developed. As described in the article, "*Ultra-High Elongation Silicone Elastomers,*" by B. Arkles, J. Goff, S. Sulaiman, and A. Sikorsky, *Rubber World* (June 2016) pp. 29-34, these silicone elastomers are produced by polymerization methods that involve first forming heterobifunctional macromers. The macromers contain a vinyl group and hydride group at opposite ends of the siloxane. First, the macromere are formulated into silane elastomer bases by compounding with fillers, pigments, and reinforcing agents. Then, the formulated bases are converted to high molecular weight silicone elastomers by platinum-catalyzed reactions. Suitable methods for forming such high elongation silicone elastomers are described in Arkles et al., U.S. Pat. No. 9,145,474, the disclosure of which is hereby incorporated by reference. One preferred method for producing such silicone elastomers in the '474 Patent comprises the steps of: (a) preparing a first mixture comprising a first telechelic siloxane and a hydrosilylation catalyst; (b) preparing a second mixture comprising a second telechelic siloxane and a dual functional siloxane having two different polymer termini; and (c) reacting the first mixture with the second mixture to produce the siloxane elastomer. This curing mechanism involves a step-growth polymerization resulting in the formation of linear polymers having very high molecular weight. There may not be any covalent crosslinking in the polymers. Rather, during the polymerization, the flexible growing polymer chains may become entangled. The polymer chains become entangled within themselves and with each other. This intra-chain or self-knotting of the polymers helps the polymers achieve extreme elongations.

The resulting high-elongation silicone elastomers have desirable properties. For example, these silicone elastomers preferably have elongations in the range of about 2,000 to about 7,000%; more preferably in the range of about 3,000 to about 6,000%; and most preferably in the range of about 4,000 to about 5,000% (as measured per ASTM D412) and tensile strengths in the range of about 4 to 12 MPa; more preferably in the range of about 6 to about 11 MPa; and most preferably in the range of about 8 to about 10 MPa (as measured per ASTM D412). In addition, these high elongation elastomers are relatively soft and have about 10 to about 50 Shore A hardness, preferably about 15 to about 25 Shore A hardness. These high elongation silicone elastomers also can be used in accordance with the present invention. Suitable commercially-available high elongation silicone elastomers include Gelest™ ExSil 100 and Gelest™ RG-09, available from Gelest, Inc., (Morrisville, Pa. USA). Other suitable silicone elastomers are NuSil™ silicones available from NuSil Technology, LLC (Carpinteria, Calif., USA). The properties of some silicone elastomers are show below in below Tables III and IV.

TABLE III

Mechanical and Physical Properties of Examples of Commercial High Elongation Silicone Elastomers.

| Property | Test Method | Gelest ™ ExSil 100 | Gelest ™ RG-09 |
|---|---|---|---|
| Elongation | D412 | 5,000% | 4,600% |
| Tensile Strength | D412 | 8 to 9 MPa | 9 to 10 MPa |
| Tear Strength | D624 | — | 40 to 42 kN/m |
| Elongation at Tear Failure | — | — | 2,000% |
| Durometer | Durometer (Shore A) | 15% | 15% |
| Compression Set at 22 hours at 23° C. | — | 5% | 5% |
| Rebound Resistance | — | 30% | 30% |
| Specific Gravity | — | 1.12 | 1.12 |

Gelest™ ExSil 100 and Gelest™ RG-09, are commercial high-elongation silicone elastomers, available from Gelest, Inc., (Morrisville, Pa. USA). The property values in Table III are based on data reported in the article, "*Ultra-High Elongation Silicone Elastomers*," by B. Arkles, J. Goff, S. Sulaiman, and A. Sikorsky, *Rubber World* (June 2016) pp. 29-34.

TABLE IV

Mechanical and Physical Properties of Examples of Commercial High Elongation Silicone Elastomers

| Property | Test Method | Gelest ™ ExSil 100 | Gelest ™ RG-09 | R32-2186 | MED-4014 |
|---|---|---|---|---|---|
| Durometer | Durometer (Shore A) | 15% | 15% | 15% | 15% |
| Elongation | D412 | 5,000% | 4,600% | 850% | 1330% |
| Tensile Strength | D412 | 8 to 9 MPa | 9 to 10 MPa | 6.7 MPa | 4.8 MPa |
| Tear Strength | D624 | — | 40 to 42 kN/m | 22 kN/m | 27 kN/m |

Gelest™ ExSil 100 and Gelest™ RG-09, are commercial high-elongation silicone elastomers, available from Gelest, Inc., (Morrisville, Pa. USA). R-32-2186 and MED-4014 are commercial high-elongation silicone elastomers, available from NuSil Technology, LLC (Carpinteria, Calif., USA). As discussed above, preferably the silicone elastomers have elongations greater than 2,000%. For example, Gelest™ ExSil 100 and Gelest™ RG-09 silicone elastomers having reported elongations of 5,000% and 4,600%, respectively can be used. However, it should be understood that other silicone elastomers having elongations less than 2,000% (for example, R-32-2186 and MED-4014 as reported in the above Table IV) also can be used in accordance with this invention.

As discussed above, the silicone elastomer compositions of the present invention may comprise materials other than the silicone elastomers. For example, the silicone elastomer compositions may contain fillers, minerals and metals, dyes and pigments, antioxidants, processing aids, surfactants, plasticizers, coloring agents, and fluorescent agents. Thermoplastic and thermoset polymers also may be added to the composition including, for example, polyesters, polyamides, polyolefins, polyurethanes, polyureas, fluoropolymers, polystyrene, polyvinyl chlorides, polycarbonates, polyethers, and polyimides Preferably, the composition comprises at least 50% by weight of silicone elastomer and more preferably at least 70% by weight based on weight of composition.

Hardness of the Foamed Inner Core

Referring back to FIG. 1, a foamed inner core (4) having a geometric center (6) and outer skin (8) may be prepared per the molding method discussed above. The outer skin (8) is generally a non-foamed region that forms the outer surface of the core structure. The resulting inner core preferably has a diameter within a range of about 0.100 to about 1.100 inches. For example, the inner core may have a diameter within a range of about 0.250 to about 1.000 inches. In another example, the inner core may have a diameter within a range of about 0.300 to about 0.800 inches. More particularly, the inner core preferably has a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. The outer skin (8) of the inner core is relatively thin preferably having a thickness of less than about 0.020 inches and more preferably less than 0.010 inches. In one preferred embodiment, the foamed core has a "positive" hardness gradient (that is, the outer skin of the inner core is harder than its geometric center.)

For example, the geometric center hardness of the inner core ($H_{inner\ core\ center}$), as measured in Shore C units, is about 10 Shore C or greater and preferably has a lower limit of about 10 or 16 or 20 or 25 or 30 or 32 or 34 or 36 or 40 Shore C and an upper limit of about 42 or 44 or 48 or 50 or 52 or 56 or 60 or 62 or 65 or 68 or 70 or 74 or 78 or 80 Shore C. In one preferred version, the geometric center hardness of the inner core ($H_{inner\ core\ center}$) is about 60 Shore C. When a flexible, relatively soft foam is used, the ($H_{inner\ core\ center}$) of the foam may have a Shore A hardness of about 5 or greater, and preferably has a lower limit of 5, 7, 10, 15, 20, 25, 30, or 35 Shore A and an upper limit of about 60, 65, 70, 80, 85, or 90 Shore A. In one preferred embodiment, the geometric center hardness of the inner core is about 55 Shore A. The $H_{inner\ core\ center}$, as measured in Shore D units, is about 15 Shore D or greater and more preferably within a range having a lower limit of about 15 or 18 or 20 or 22 or 25 or 28 or 30 or 32 or 36 or 40 or 44 Shore D and an upper limit of about 45 or 48 or 50 or 52 or 55 or 58 or 60 or 62 or 64 or 66 or 70 or 72 or 74 or 78 or 80 or 82 or 84 or 88 or 90 Shore D. Meanwhile, the outer surface hardness of the inner core ($H_{inner\ core\ surface}$), as measured in Shore C, is about 20 Shore C or greater and preferably has a lower limit of about 13 or 17 or 20 or 22 or 24 or 28 or 30 or 32 or 35 or 36 or 40 or 42 or 44 or 48 or 50 or 52 or 55 or 58 or 60 or 62 or 65 and an upper limit of about or 68 or 70 or 74 or 78 or 80 or 86 or 88 or 90 or 92 or 96 Shore C. The outer surface hardness of the inner core (($H_{inner\ core\ surface}$), as measured in Shore D units, preferably has a lower limit of about 25 or 28 or 30 or 32 or 36 or 40 or 44 Shore D and an upper limit of about 45 or 48 or 50 or 52 or 55 or 58 or 60 or 62 or 64 or 66 or 70 or 74 or 78 or 80 or 82 or 84 or 88 or 90 or 94 or 96 Shore D. When measured in Shore A units, the outer surface hardness of the inner core (($H_{inner\ core\ surface}$) general has a hardness of about 5 or greater, and preferably has a lower limit of 5, 7, 10, 15, 20, 25, 30, 32, 35, or 40 Shore A and an upper limit of about 50, 55, 60, 65, 70, 80, 85, or 90 Shore A.

Density of the Inner Core

The foamed inner core preferably has a specific gravity of about 0.25 to about 1.25 g/cc. That is, the density of the inner core (as measured at any point of the inner core structure) is preferably within the range of about 0.25 to about 1.25 g/cc. By the term, "specific gravity of the inner core" ("$SG_{inner}$"), it is generally meant the specific gravity of the inner core as measured at any point of the inner core structure. It should be understood, however, that the specific gravity values, as taken at different points of the inner core structure, may vary. For example, the foamed inner core may have a "positive" density gradient (that is, the outer surface (skin) of the inner core may have a density greater than the geometric center of the inner core.) In one preferred version, the specific gravity of the geometric center of the inner core ($SG_{center\ of\ inner\ core}$) is less than 1.00 g/cc and more preferably 0.90 g/cc or less. More particularly, in one version, the ($SG_{center\ of\ inner\ core}$) is in the range of about 0.10 to about 0.90 g/cc. For example, the ($SG_{center\ of\ inner\ core}$) may be within a range having a lower limit of about 0.10 or 0.15 of 0.20 or 0.24 or 0.30 or 0.35 or 0.37 or 0.40 or 0.42 or 0.45 or 0.47 or 0.50 and an upper limit of about 0.60 or 0.65 or 0.70 or 0.74 or 0.78 or 0.80, or 0.82 or 0.84 or 0.85 or 0.88 or 0.90 g/cc. Meanwhile, the specific gravity of the outer surface (skin) of the inner core ($SG_{skin\ of\ inner\ core}$), in one preferred version, is greater than about 0.90 g/cc and more preferably greater than 1.00 g/cc. For example, the ($SG_{skin\ of\ inner\ core}$) may fall within the range of about 0.90 to about 2.00. More particularly, in one version, the ($SG_{skin\ of\ inner\ core}$) may have a specific gravity with a lower limit of about 0.90 or 0.92 or 0.95 or 0.98 or 1.00 or 1.02 or 1.06 or 1.10 or 1.12 or 1.15 or 1.18 and an upper limit of about 1.20 or 1.24 or 1.30 or 1.32 or 1.35 or 1.38 or 1.40 or 1.44 or 1.50 or 1.60 or 1.65 or 1.70 or 1.76 or 1.80 or 1.90 or 1.92 or 2.00. In other instances, the outer skin may have a specific gravity of less than 0.90 g/cc. For example, the specific gravity of the outer skin ($SG_{skin\ of\ inner\ core}$) may be about 0.75 or 0.80 or 0.82 or 0.85 or 0.88 g/cc. In such instances, wherein both the ($SG_{center\ of\ inner\ core}$) and ($SG_{skin\ of\ inner\ core}$) are less than 0.90 g/cc, it is still preferred that the ($SG_{center\ of\ inner\ core}$) is less than the ($SG_{skin\ of\ inner\ core}$).

Two-Layered Cores

As discussed above, the inner core (center) is made preferably from a foamed silicone composition. Preferably, a two-layered or dual-core is made, wherein the inner core is surrounded by an outer core layer. In one preferred embodiment, the outer core layer is formed from a non-foamed thermoset composition and more preferably from a non-foamed thermoset rubber composition.

Suitable thermoset rubber materials that may be used to form the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed. As discussed further below, in one preferred embodiment, the specific gravity of the inner core layer (for example, foamed polyurethane) has a specific gravity less than the outer core layer (for example, polybutadiene rubber). In such an event, if mineral, metal, or other fillers are added to the polybutadiene rubber composition used to form the outer core, it is important the concentration of such fillers be sufficient so that the specific gravity of the outer core layer is greater than the specific gravity of the inner core. For example, the concentration of the fillers may be in an amount of at least about 5% by weight based on total weight of composition In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

In alternative embodiments, the outer core layer may comprise a thermoplastic material, for example, an ionomer composition containing acid groups that are at least partially-neutralized. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_5$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred a, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_5$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the outer core layer include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly (butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversible cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure of thermoplastic can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

For example, a core assembly having a thermoplastic layer may be converted to a thermoset layer by placing the core assembly on a slowly move along a channel. Radiation from a radiation source, such as gamma rays, is allowed to contact the surface of the cores. The source is positioned to provide a generally uniform dose of radiation to the cores as they roll along the channel. The speed of the cores as they pass through the radiation source is easily controlled to ensure the cores receive sufficient dosage to create the desired hardness gradient. The cores are irradiated with a dosage of 1 or more Mrd, more preferably 2 Mrd to 15 Mrd. The intensity of the dosage is typically in the range of 1 MeV to 20 MeV. For thermoplastic resins having a reactive group (e.g., ionomers, thermoplastic urethanes, and the like), treating the thermoplastic core layer in a chemical solution of an isocyanate or an amine affects cross-linking and provides a harder surface and subsequent hardness gradient. Incorporation of peroxide or other free-radical initiator in the thermoplastic polymer, prior to molding or forming, also allows for heat curing on the molded core layer to create the desired hardness gradient. By proper selection of time/temperature, an annealing process can be used to create a gradient. Suitable annealing and/or peroxide (free radical) methods are such as disclosed in U.S. Pat. Nos. 5,274,041 and 5,356,941, respectively, which are incorporated by reference herein. Additionally, silane or amino-silane cross-linking may also be employed as disclosed in U.S. Pat. No. 7,279,529, the disclosure of which incorporated herein by reference. The core layer may be chemically treated in a solution, such as a solution containing one or more isocyanates, to form the desired "positive hardness gradient." The cores are typically exposed to the solution containing the isocyanate by immersing them in a bath at a particular temperature for a given time. Exposure time should be greater than 1 minute, preferably from 1 minute to 120 minutes, more preferably 5 minutes to 90 minutes, and most preferably 10 minutes to 60 minutes. In one preferred embodiment, the cores are immersed in the treating solution from 15 minutes to 45 minutes, more preferably from 20 minutes to 40 minutes, and most preferably from 25 minutes to 30 minutes.

The core layers may be chemically treated in a solution, such as a solution containing one or more isocyanates, to form the desired "positive hardness gradient." The cores are typically exposed to the solution containing the isocyanate by immersing them in a bath at a particular temperature for a given time. Exposure time should be greater than 1 minute, preferably from 1 minute to 120 minutes, more preferably 5 minutes to 90 minutes, and most preferably 10 minutes to 60 minutes. In one preferred embodiment, the cores are immersed in the treating solution from 15 minutes to 45 minutes, more preferably from 20 minutes to 40 minutes, and most preferably from 25 minutes to 30 minutes. Both irradiative and chemical methods promote molecular bonding, or cross-links, within the TP polymer. Radiative methods permit cross-linking and grafting in situ on finished products and cross-linking occurs at lower temperatures with radiation than with chemical processing. Chemical methods depend on the particular polymer, the presence of modifying agents, and variables in processing, such as the level of irradiation. Significant property benefits in the thermoplastic materials can be attained and include, but are not limited to, improved thermomechanical properties; lower permeability and improved chemical resistance; reduced stress cracking; and overall improvement in physical toughness.

Additional embodiments involve the use of plasticizers to treat the core layers, thereby creating a softer outer portion of the core for a "negative" hardness gradient. The plasticizer may be reactive (such as higher alkyl acrylates) or non-reactive (that is, phthalates, dioctylphthalate, or stearamides, etc). Other suitable plasticizers include, but are not limited to, oxa acids, fatty amines, fatty amides, fatty acid esters, phthalates, adipates, and sebacates. Oxa acids are preferred plasticizers, more preferably those having at least one or two acid functional groups and a variety of different chain lengths. Preferred oxa acids include 3,6-dioxaheptanoic acid, 3,6,9-trioxadecanoic acid, diglycolic acid, 3,6,9-trioxaundecanoic acid, polyglycol diacid, and 3,6-dioxaoctanedioic acid, such as those commercially available from Archimica of Wilmington, Del. Any means of chemical degradation will also result in a "negative" hardness gradient. Chemical modifications such as esterification or saponification are also suitable for modification of the thermoplastic core layer surface and can result in the desired "positive" hardness gradient.

Core Structure

Figure 3:
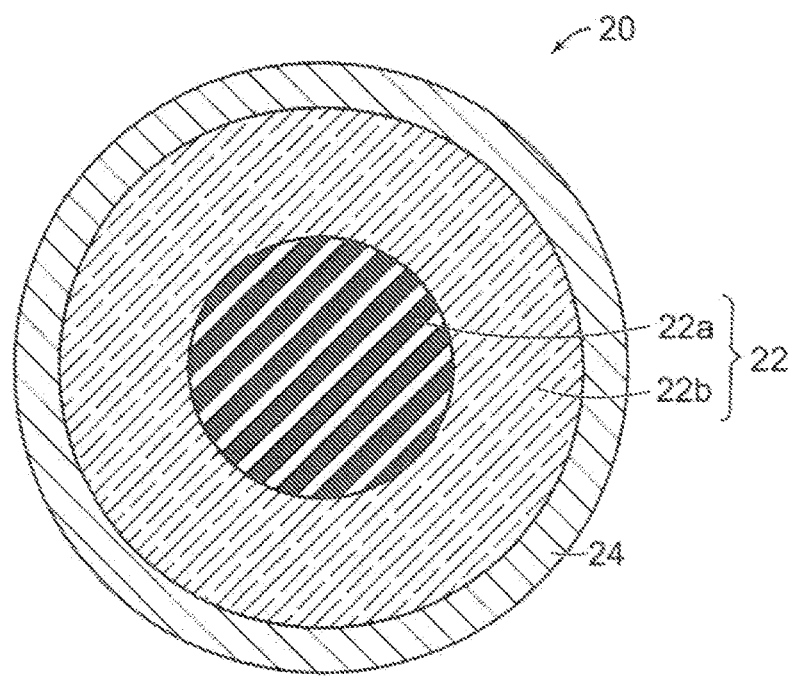
FIG. 3 is a cross-sectional view of a three-piece golf ball having a dual-layered core made in accordance with the present invention.

As discussed above, the core of the golf ball of this invention preferably has a dual-layered structure comprising an inner core and outer core layer. Referring to FIG. 3, one version of a golf ball that can be made in accordance with this invention is generally indicated at (20). The ball (20) contains a dual-layered core (22) having an inner core (center) (22a) and outer core layer (22b) surrounded by a single-layered cover (24). The inner core (22a) is relatively small in volume and generally has a diameter within a range of about 0.10 to about 1.10 inches. More particularly, the inner core (22a) preferably has a diameter size with a lower limit of about 0.15 or 0.25 or 0.35 or 0.45 or 0.55 inches and an upper limit of about 0.60 or 0.70 or 0.80 or 0.90 inches. In one preferred version, the diameter of the inner core (22a) is in the range of about 0.025 to about 0.080 inches, more preferably about 0.030 to about 0.075 inches. Meanwhile, the outer core layer (22b) generally has a thickness within a range of about 0.010 to about 0.250 inches and preferably has a lower limit of 0.010 or 0.020 or 0.025 or 0.030 inches and an upper limit of 0.070 or 0.080 or 0.100 or 0.200 inches. In one preferred version, the outer core layer has a thickness in the range of about 0.040 to about 0.170 inches, more preferably about 0.060 to about 0.150 inches.

Figure 4:
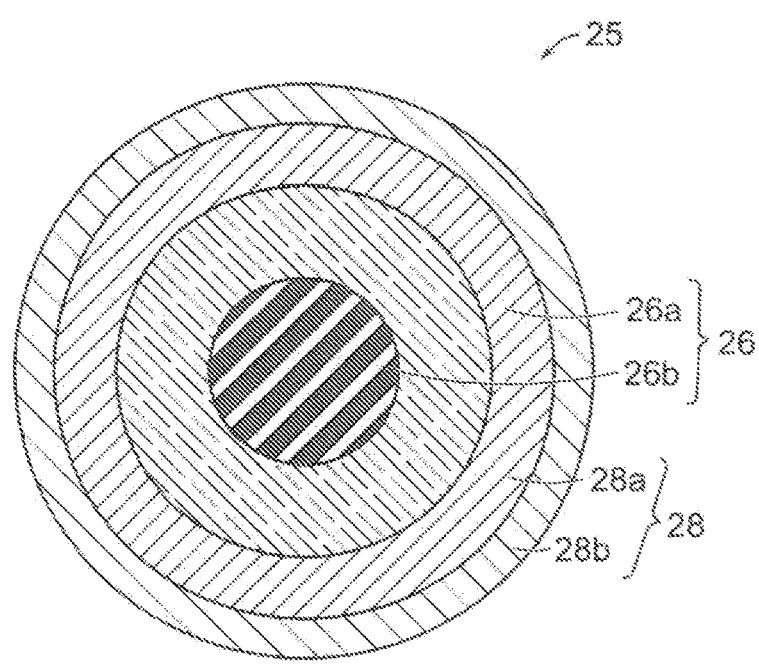
FIG. 4 is a cross-sectional view of a four-piece golf ball having a dual-layered core made in accordance with the present invention.

Referring to FIG. 4, in another version, the golf ball (25) contains a dual-core (26) having an inner core (center) (26a) and outer core layer (26b). The dual-core (26) is surrounded by a multi-layered cover (28) having an inner cover layer (28a) and outer cover layer (28b).

The hardness of the core sub-assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness of the outer core layer ($H_{inner\ surface\ of\ OC}$), as measured in Shore C units, preferably has a lower limit of about 40 or 42 or 44 or 45 or 47 or 50 or 52 or 54 or 55 or 58 or 60 or 63 or 65 or 67 or 70 or 73 or 76 Shore C, and an upper limit of about 78 or 80 or 85 or 88 or 89 or 90 or 92 or 95 Shore C. When measured in Shore A units, the outer surface hardness of the outer core (($H_{outer\ surface\ of\ OC}$) generally has a hardness of about 5 or greater, and preferably has a lower limit of 5, 7, 10, 15, 20, 25, 30, 35, 40, or 42 Shore A and an upper limit of about 50, 55, 60, 65, 70, 80, 85, or 90 Shore A.

In one embodiment, the outer surface hardness of the outer core layer ($H_{outer\ surface\ of\ OC}$), is less than the outer surface hardness ($H_{inner\ core\ surface}$) of the inner core by at least 3 Shore C units and more preferably by at least 5 Shore C.

In a second embodiment, the outer surface hardness of the outer core layer ($H_{outer}$ surface of OC), is greater than the outer surface hardness ($H_{inner\ core\ surface}$) of the inner core by at least 3 Shore C units and more preferably by at least 5 Shore C.

As discussed above, the inner core is preferably formed from a foamed thermoplastic or thermoset composition and more preferably foamed polyurethanes. And, the outer core layer is formed preferably from a non-foamed thermoset composition such as polybutadiene rubber.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. The gradient across the core assembly will vary based on several factors including, but not limited to, the dimensions of the inner core, intermediate core, and outer core layers.

The inner core preferably has a diameter in the range of about 0.100 to about 1.100 inches. For example, the inner core may have a diameter within a range of about 0.100 to about 0.500 inches. In another example, the inner core may have a diameter within a range of about 0.300 to about 0.800 inches. More particularly, the inner core may have a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. As far as the outer core layer is concerned, it preferably has a thickness in the range of about 0.100 to about 0.750 inches. For example, the lower limit of thickness may be about 0.050 or 0.100 or 0.150 or 0.200 or 0.250 or 0.300 or 0.340 or 0.400 and the upper limit may be about 0.500 or 0.550 or 0.600 or 0.650 or 0.700 or 0.750 inches.

Dual-layered core structures containing layers with various thickness and volume levels may be made in accordance with this invention. For example, in one version, the total diameter of the core structure is 0.20 inches and the total volume of the core structure is 0.23 cc. More particularly, in this example, the diameter of the inner core is 0.10 inches and the volume of the inner core is 0.10 cc; while the thickness of the outer core is 0.100 inches and the volume of the outer core is 0.13 cc. In another version, the total core diameter is about 1.55 inches and the total core volume is 31.96 cc. In this version, the outer core layer has a thickness of 0.400 inches and volume of 28.34 cc. Meanwhile, the inner core has a diameter of 0.75 inches and volume of 3.62 cm. In one embodiment, the volume of the outer core layer is greater than the volume of the inner core. In another embodiment, the volume of the outer core layer and inner core are equivalent. In still another embodiment, the volume of the outer core layer is less than the volume of the inner core. Other examples of core structures containing layers of varying thicknesses and volumes are described below in Table A.

TABLE A

Sample Core Dimensions

| Example | Total Core Diameter | Total Core Volume | Thermoset Outer Core Thickness | Outer Core Volume | Foamed Inner Core Diameter | Volume of Inner Core |
|---|---|---|---|---|---|---|
| A | 0.30" | 0.23 cc | 0.100" | 0.13 cc | 0.10" | 0.10 cc |
| B | 1.60" | 33.15 cc | 0.750" | 33.05 cc | 0.10" | 0.10 cc |
| C | 1.55" | 31.96 cc | 0.225" | 11.42 cc | 1.10" | 11.42 cc |
| D | 1.55" | 31.96 cc | 0.400" | 28.34 cc | 0.75" | 3.62 cc |
| E | 1.55" | 31.96 cc | 0.525" | 28.34 cc | 0.50" | 3.62 cc |

In one preferred embodiment, the inner core has a specific gravity in the range of about 0.25 to about 1.25 g/cc. Also, as discussed above, the specific gravity of the inner core may vary at different points of the inner core structure. That is, there may be a specific gravity gradient in the inner core. For example, in one preferred version, the geometric center of the inner core has a density in the range of about 0.25 to about 0.75 g/cc; while the outer skin of the inner core has a density in the range of about 0.75 to about 1.50 g/cc.

Meanwhile, the outer core layer preferably has a relatively high specific gravity. Thus, the specific gravity of the inner core layer ($SG_{inner}$) preferably less than the specific inner, is gravity of the outer core layer ($SG_{outer}$). By the term, "specific gravity of the outer core layer" ("$SG_{outer}$"), it is generally meant the specific gravity of the outer core layer as measured at any point of the outer core layer. The specific gravity values at different points in the outer core layer may vary. That is, there may be specific gravity gradients in the outer core layer similar to the inner core. For example, the outer core layer may have a specific gravity within a range having a lower limit of about 0.50 or 0.60 or 0.70 or 0.75 or 0.85 or 0.95 or 1.00 or 1.10 or 1.25 or 1.30 or 1.36 or 1.40 or 1.42 or 1.48 or 1.50 or 1.60 or 1.66 or 1.75 or 2.00 and an upper limit of 2.50 or 2.60 or 2.80 or 2.90 or 3.00 or 3.10 or 3.25 or 3.50 or 3.60 or 3.80 or 4.00, 4.25 or 5.00 or 5.10 or 5.20 or 5.30 or 5.40 or 6.00 or 6.20 or 6.25 or 6.30 or 6.40 or 6.50 or 7.00 or 7.10 or 7.25 or 7.50 or 7.60 or 7.65 or 7.80 or 8.00 or 8.20 or 8.50 or 9.00 or 9.75 or 10.00 g/cc.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center (the center piece (for example, inner core) has a higher specific gravity than the outer piece (for example, outer core layers), less force is required to change its rotational rate, and the ball has a relatively low Moment of Inertia. In such balls, most of the mass is located close to the ball's axis of rotation and less force is needed to generate spin. Thus, the ball has a generally high spin rate as the ball leaves the club's face after making impact. Conversely, if the ball's mass is concentrated towards the outer surface (the outer piece (for example, outer core layers) has a higher specific gravity than the center piece (for example, inner core), more force is required to change its rotational rate, and the ball has a relatively high Moment of Inertia. That is, in such balls, most of the mass is located away from the ball's axis of rotation and more force is needed to generate spin. Such balls have a generally low spin rate as the ball leaves the club's face after making impact.

More particularly, as described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm$^3$.

In one embodiment, the golf balls of this invention are relatively low spin and long distance. That is, the foam core construction, as described above, wherein the inner core is made of a foamed composition helps provide a relatively low spin ball having good resiliency. The inner foam cores of this invention preferably have a Coefficient of Restitution (COR) of about 0.300 or greater; more preferably about 0.400 or greater, and even more preferably about 0.450 or greater. The resulting balls containing the dual-layered core constructions of this invention and cover of at least one layer preferably have a COR of about 0.700 or greater, more preferably about 0.730 or greater; and even more preferably about 0.750 to 0.810 or greater. The inner foam cores preferably have a Soft Center Deflection Index ("SCDI") compression, as described in the Test Methods below, in the range of about 50 to about 190, and more preferably in the range of about 60 to about 170.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate (casing) layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches.

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more casing (mantle) layers disposed about the core. In one particularly preferred version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® 10 ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make the casing (mantle) and cover layers may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

A single cover or, preferably, an inner cover layer is formed around the outer core layer. When an inner cover layer is present, an outer cover layer is formed over the inner cover layer. Most preferably, the inner cover is formed from an ionomeric material and the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™, commercially available form DuPont, a thermoplastic polyether block amide, such as Pebax™, commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Manufacturing of Golf Balls

As described above, the inner core preferably is formed by a casting method. The outer core layer, which surrounds the inner core, is formed by molding compositions over the inner core. Compression or injection molding techniques may be used to form the other layers of the core sub-assembly. Then, the casing and/or cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball sub-assembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different ball constructions can be made using the core construction of this invention as shown in FIGS. 3-6. Such golf ball constructions include, for example, five-piece, and six-piece constructions. It should be understood that the golf balls shown in FIGS. 3-6 are for illustrative purposes only, and they are not meant to be restrictive. Other golf ball constructions can be made in accordance with this invention.

Cores Having Three Layers

For example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a foamed composition, preferably foamed polyurethane. Meanwhile, the intermediate and outer core layers may be formed from non-foamed thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a non-foamed thermoset composition; and the outer core layer is formed from a non-foamed thermoplastic composition. In a third embodiment, the intermediate core layer is formed from a non-foamed thermoplastic composition; and the outer core layer is formed from a non-foamed thermoset composition. Finally, in a fourth embodiment, the intermediate core layer is formed from a first non-foamed thermoplastic composition; and the outer core layer is formed from a second non-foamed thermoplastic compositions.

The above-discussed thermoset and thermoplastic compositions may be used to form the intermediate and outer core layers. In one embodiment, the specific gravity of the inner core (foamed composition) is less than the specific gravity of the intermediate and outer core layers. The specific gravities of the intermediate and outer core layers may be the same or different. In one version, the specific gravity of the intermediate core layer is greater than the specific gravity of the outer core layer. In another version, the specific gravity of the outer core is greater than the specific gravity of the intermediate core layer.

Cores Having Two or More Foam Layers

In another example, cores having two or more layers comprising foamed compositions may be made in accordance with this invention. In one embodiment, a dual-core structure having an inner core layer comprising a first foamed silicone composition, and an outer core layer comprising a second foamed silicone composition is made. The inner core layer preferably has a diameter in the range of about 0.100 to about 1.100 inches and the outer core layer preferably has a thickness in the range of about 0.100 to about 0.750 inches. The specific gravity of the outer core ($SG_{outer}$) is preferably greater than the specific gravity of the inner core ($SG_{inner}$). Alternatively, the inner core may have a greater specific gravity than the outer core's specific gravity. In yet another version, the specific gravities of the inner and outer core layers are substantially equivalent. Furthermore, the inner cover layer, which surrounds the core sub-assembly, may be foamed or non-foamed. Suitable thermoset and thermoplastic compositions that may be used to form the foam compositions for constructing the different core and cover layers are discussed above. For example, in another embodiment, a dual-core structure having an inner core layer comprising a first foamed silicone composition, and an outer core layer comprising a foamed polyurethane composition is made. Thus, the silicone foam composition of this invention is preferably used to manufacture the inner core layer (center), but it also may be used to make intermediate and outer core layers in accordance with this invention. It also is recognized that the silicone foam composition may be used to manufacture non-core layers in the golf ball including, but not limited to, the intermediate (casing) layers and inner and outer cover layers.

Where more than one foam layer is used in a single golf ball, the respective foamed chemical compositions may be the same or different, and the compositions may have the same or different hardness or specific gravity levels. For example, a golf ball may contain a dual-core having a foamed silicone center with a specific gravity of about 0.40 g/cc and a geometric center hardness of about 50 Shore C and a center surface hardness of about 75 Shore C. Meanwhile, the outer core layer may be made from a foamed highly-neutralized ionomer (HNP) composition, wherein the outer core layer has a specific gravity of about 0.80 g/cc and a surface hardness of about 80 Shore C.

In another example, a golf ball having a foamed center made of a foamed silicone composition and a surrounding outer core layer made of a foamed highly-neutralized ionomer (HNP) may be made. In one embodiment, the foamed center has a specific gravity of about 0.40 g/cc, and the foamed outer core layer has a specific gravity of about 0.80 g/cc. In a third example, a silicone foam center (0.50 inch diameter) is encased in a HNP foam outer core layer (0.06 inch thickness). The inner foamed silicone core has a specific gravity of 0.5 g/cc and a surface hardness of 80 Shore C, while the outer foamed HNP core has a specific gravity of 0.90 g/cc and a surface hardness of 70 Shore C. The dual-core is enclosed in a dual-cover, wherein the inner cover is made of a relatively hard ionomer composition (for example, a 50/50 blend of Surlyn® 7940 and Surlyn® 8940 or a 50/50 blend of Surlyn® 9910/Surlyn® 8940) preferably having a thickness of 0.06 inches and an outer cover made of a relatively soft polyurethane composition preferably having a thickness of 0.03 inches.

In a fourth example, a rigid foam outer core layer comprising a thermoset polyurethane foam composition is molded over an inner core (center) comprising a HNP foam composition to provide a "hard over soft" dual-core that reduces ball spin and increases ball distance. In this example, the HNP foam center has a diameter of about 0.50 to about 0.80 inches, and the outer core layer of cast, thermoset foam has an outer diameter of about 1.30 to about 1.58 inches. The dual-core is enclosed in a dual-cover, wherein the inner cover is made of a relatively hard ionomer composition (for example, a 50/50 blend of Surlyn® 7940 and Surlyn® 8940 or a 50/50 blend of Surlyn® 9910/ Surlyn® 8940) preferably having a thickness of 0.06 inches and an outer cover made of a relatively soft polyurethane composition preferably having a thickness of 0.03 inches. In this embodiment, either the inner cover comprising the ionomer blend or the outer cover comprising the polyurethane preferably contains a sufficient amount of heavy filler to adjust the weight of the golf ball so that it is at least 44 grams, preferably 45.0 to 45.9 grams. In an alternative embodiment, a relatively soft polyurethane foam composition is used to form the inner core (center) as opposed to the foamed HNP composition. The soft polyurethane foam material used to form the inner core preferably has a different chemical composition than the soft polyurethane material used to form the outer cover.

Furthermore, multi-layered cores having an inner core, intermediate core layer, and outer core layer (as discussed above) may be made, wherein at least two of the layers comprise foamed compositions. The core may have adjoining foam layers, for example, the inner core and intermediate core layers may be made of foamed silicone compositions, while the outer core layer may be made of a non-foamed thermoset or thermoplastic composition. For example, a polybutadiene foamed center (0.50 inch diameter) is encased in a partially-neutralized ionomer foamed intermediate core layer (0.050 inch thickness). The inner foamed polybutadiene core may have a specific gravity of 0.85 g/cc and a surface hardness of 65 Shore C, while the partially-neutralized ionomer foamed intermediate core layer may have a specific gravity of 0.70 g/cc and a surface hardness of 85 Shore C. An outer core layer made of a relative hard HNP ionomer composition having a specific gravity of 0.70 g/cc and a surface hardness of 85 Shore C surrounds the intermediate core layer. The three-layered core structure ("triple core") is enclosed in a dual-cover, wherein the inner cover is made of a relatively hard ionomer composition and an outer cover made of a relatively soft polyurethane composition.

In an alternative version, the core may have a non-foamed thermoset or thermoplastic layer disposed between two foam layers. For example, the inner and outer core layers may be made of a foamed silicone composition, and these layers may form a sandwich around an intermediate core layer made of a non-foamed thermoset or thermoplastic composition such as polybutadiene rubber.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Density. The density refers to the weight per unit volume (typically, $g/cm^3$) of the material and can be measured per ASTM D-1622.

It is understood that the golf ball compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

What is claimed is:

1. A golf ball, comprising:
    i) an inner core layer comprising a thermoplastic composition, the inner core layer having a diameter in the range of about 0.100 to about 1.100 inches, and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient;
    ii) an intermediate core layer comprising a silicone elastomer composition, wherein the silicone elastomer composition is made from at least one heterobifunctional macromer, the intermediate layer being disposed about the inner core and having a thickness in the range of about 0.050 to about 0.400 inches, and an outer surface hardness ($H_{outer\ surface\ of\ IC}$) and a midpoint hardness ($H_{midpoint\ of\ IC}$), the $H_{outer\ surface\ of\ IC}$ being greater than the H provide a midpoint of IC to positive hardness gradient; and
    iii) an outer core layer comprising a thermoplastic composition, the outer core layer being disposed about the intermediate core layer and having a thickness in the range of about 0.200 to about 0.750 inches, and an outer surface hardness ($H_{outer\ surface\ of\ OC}$) and an inner surface hardness ($H_{inner\ surface\ of\ OC}$), the $H_{outer\ surface\ of\ OC}$ being the same or less than the $H_{inner\ surface\ of\ OC}$ to provide a zero or negative hardness gradient.

2. The golf ball of claim 1, wherein the center hardness of the inner core ($H_{inner\ core\ center}$) is in the range of about 10 Shore C to about 60 Shore C and the outer surface hardness of the outer core layer ($H_{outer\ surface\ of\ OC}$) is in the range of about 40 Shore C to about 93 Shore C to provide a positive hardness gradient across the core.

3. The golf ball of claim 1, wherein the $H_{midpoint\ of\ IC}$ is in the range of about 15 Shore A to about 80 Shore A, and the $H_{outer\ surface\ of\ IC}$ is in the range of about 37 Shore A to and about 87 Shore A.

4. The golf ball of claim 1, wherein the inner and outer core layer comprises at least one thermoplastic material selected from the group consisting of partially-neutralized ethylene acid copolymers; highly-neutralized ethylene acid copolymers; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

5. The golf ball of claim 4, wherein the thermoplastic material is a highly-neutralized ethylene acid copolymer composition comprising an E/X-type copolymer, wherein E is ethylene, X is a $C_3$-$C_8$ α,β-ethylenically unsaturated carboxylic acid wherein greater than 70% of the acid groups present in the composition are neutralized with a metal ion.

6. The golf ball of claim 4, wherein the thermoplastic material is a highly-neutralized ethylene acid copolymer composition comprising an E/X/Y-type copolymer, wherein E is ethylene, X is a $C_3$-$C_8$ α,β-ethylenically unsaturated carboxylic acid and Y is an acrylate selected from alkyl acrylates and aryl acrylates and wherein greater than 70% of the acid groups present in the composition are neutralized with a metal ion.

7. The golf ball of claim 1, wherein the silicone elastomer composition has an elongation greater than 2000%.

8. The golf ball of claim 1, wherein the silicone elastomer composition has an elongation greater than 3000%.

* * * * *